US010027353B2

(12) United States Patent
Uejima et al.

(10) Patent No.: US 10,027,353 B2
(45) Date of Patent: Jul. 17, 2018

(54) HIGH-FREQUENCY FRONT END CIRCUIT

(71) Applicant: Murata Manufacturing Co., Ltd., Nagaokakyo-shi, Kyoto-fu (JP)

(72) Inventors: Takanori Uejima, Nagaokakyo (JP); Hiromichi Kitajima, Nagaokakyo (JP); Saneaki Ariumi, Nagaokakyo (JP); Hisao Hayafuji, Nagaokakyo (JP); Tatsuya Tsujiguchi, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 98 days.

(21) Appl. No.: 15/235,267

(22) Filed: Aug. 12, 2016

(65) Prior Publication Data

US 2016/0352365 A1 Dec. 1, 2016

Related U.S. Application Data

(63) Continuation of application No. PCT/JP2015/053464, filed on Feb. 9, 2015.

(30) Foreign Application Priority Data

Feb. 19, 2014 (JP) ................. 2014-029838

(51) Int. Cl.
 *H04L 5/14* (2006.01)
 *H04B 1/00* (2006.01)
 (Continued)

(52) U.S. Cl.
 CPC ......... *H04B 1/0057* (2013.01); *H04B 1/0458* (2013.01); *H04B 1/52* (2013.01)

(58) Field of Classification Search
 CPC .......................................................... H04L 5/14
 See application file for complete search history.

(56) References Cited

U.S. PATENT DOCUMENTS 5,406,236 A * 4/1995 Newell ................. H01P 1/2056
  333/206
6,472,952 B1 * 10/2002 Sakai ....................... H04B 1/18
  333/126

(Continued)

FOREIGN PATENT DOCUMENTS

DE 10 2008 003 820 A1 8/2009
JP 4-10718 A 1/1992
(Continued)

OTHER PUBLICATIONS

English translation of Official Communication issued in corresponding International Application PCT/JP2015/053464, dated Apr. 7, 2015.

(Continued)

*Primary Examiner* — Hassan Phillips
*Assistant Examiner* — Prenell Jones
(74) *Attorney, Agent, or Firm* — Keating & Bennett, LLP

(57) ABSTRACT

A high-frequency front end circuit includes a duplexer, a phase adjustment circuit, and a power amplifier. The phase adjustment circuit is connected between the power amplifier and a transmission filter of the duplexer. The phase adjustment circuit carries out phase adjustment so that a quadrant in which an impedance ZRX (fr0) seen from the transmission filter toward the power amplifier at the fundamental frequency of a reception signal is present and a quadrant in which an impedance ZTX (fr0) seen from the power amplifier toward the transmission filter at the fundamental frequency of the reception signal is present are not in a conjugate relationship with respect to the phase.

16 Claims, 5 Drawing Sheets

(51) Int. Cl.
*H04B 1/52* (2015.01)
*H04B 1/04* (2006.01)

(56) References Cited

U.S. PATENT DOCUMENTS

| | | |
|---|---|---|
| 2007/0285187 A1 | 12/2007 | Kawasaki |
| 2008/0116993 A1* | 5/2008 | Yamakawa ............ H03H 9/568 |
| | | 333/124 |
| 2010/0302976 A1 | 12/2010 | Tikka |
| 2012/0083216 A1* | 4/2012 | Kenington ........... H04B 1/0057 |
| | | 455/63.1 |

FOREIGN PATENT DOCUMENTS

| | | |
|---|---|---|
| JP | 06-252644 A | 9/1994 |
| JP | 2003-283363 A | 10/2003 |
| JP | 2004-120295 A | 4/2004 |
| JP | 2004-235815 A | 8/2004 |
| JP | 2005-109889 A | 4/2005 |
| JP | 2007-312221 A | 11/2007 |
| JP | 2010-16620 A | 1/2010 |
| WO | 00/28673 A1 | 5/2000 |

OTHER PUBLICATIONS

Official Communication issued in Japanese Patent Application No. 2016-504035, dated Jul. 11, 2017.
Official Communication issued in corresponding German Patent Application No. 112015000867.5, dated Aug. 8, 2017.
Meinke et al. "Taschenbuch der Hochfrequenztechnik", 4th edition, Springer-Verlag, 1986, ISBN 3-540-15393-4, 8 pages.

* cited by examiner

HIGH-FREQUENCY FRONT END CIRCUIT

CROSS REFERENCE TO RELATED APPLICATIONS

This application claims the benefit of priority to Japanese Patent Application 2014-029838 filed Feb. 19, 2014 and is a Continuation Application of PCT/JP2015/053464 filed on Feb. 9, 2015, the entire contents of each application are hereby incorporated herein by reference.

BACKGROUND OF THE INVENTION

1. Field of the Invention

The present invention relates to a high-frequency front end circuit that transmits and receives high-frequency signals.

2. Description of the Related Art

Various types of high-frequency front end circuits have been proposed thus far. Some high-frequency front end circuits include duplexers that combine a transmission filter and a reception filter, such as that disclosed in Japanese Unexamined Patent Application Publication No. 2004-120295.

In the duplexer, one end of the transmission filter and one end of the reception filter are connected in a common terminal configuration, and the common terminal is connected to an antenna or an antenna-side circuit. Another end of the transmission filter is connected to a transmission circuit, and another end of the reception filter is connected to a reception circuit.

According to such a high-frequency front end circuit, the transmission filter and the reception filter are connected, and thus to prevent a transmission signal from sneaking into the reception filter side, an impedance is set at the fundamental frequency of the transmission signal such that the reception filter side is open as seen from the transmission filter side.

However, it has been discovered that the reception sensitivity of the reception circuit connected to the reception filter will decay in such conventional high-frequency front end circuits even if isolation is ensured between the transmission filter and the reception filter as described above.

SUMMARY OF THE INVENTION

Accordingly, preferred embodiments of the present invention provide a high-frequency front end circuit capable of significantly reducing or preventing reception sensitivity decay.

A high-frequency front end circuit according to a preferred embodiment of the present invention includes a demultiplexing circuit, a power amplifier, and a phase adjustment circuit. The demultiplexing circuit includes a transmission filter configured so that a fundamental frequency band of a transmission signal is within a pass band of the transmission filter and a reception filter configured so that a fundamental frequency band of a reception signal is within a pass band of the reception filter. In the demultiplexing circuit, one end of the transmission filter and one end of the reception filter are electrically connected with a common connection point provided therebetween. The power amplifier is electrically connected to another end of the transmission filter. The phase adjustment circuit is electrically connected between the power amplifier and the transmission filter.

The phase adjustment circuit carries out phase adjustment as follows. It is assumed that a Smith chart is divided into four quadrants by a first line indicating a pure resistance and a second line that connects points of phases of 90° on the outer circumference of the Smith chart to a reference impedance point. The phase adjustment circuit functions so that at the fundamental frequency of the reception signal, a quadrant where a phase of the power amplifier seen from the transmission filter is present and a quadrant where a phase seen from the power amplifier toward the transmission filter is present are not in a conjugate relationship.

According to this configuration, it is easy to ensure impedance mismatching between the power amplifier and the transmission filter at the fundamental frequency of the reception signal. This prevents noise matching the fundamental frequency of the reception signal from sneaking into the reception filter side.

Additionally, it is preferable that a high-frequency front end circuit according to a preferred embodiment of the present invention have the following configuration. The phase adjustment circuit carries out the phase adjustment so that at the fundamental frequency of the reception signal, a quadrant where a phase of the power amplifier seen from the transmission filter is present and a quadrant where a phase seen from the power amplifier toward the transmission filter is present are located on opposite sides of the second line.

According to this configuration, it is easy to ensure even greater impedance mismatching between the power amplifier and the transmission filter at the fundamental frequency of the reception signal.

Additionally, it is preferable that a high-frequency front end circuit according to a preferred embodiment of the present invention have the following configuration. The phase adjustment circuit carries out the phase adjustment so that an impedance at the fundamental frequency of the transmission signal becomes closer to the reference impedance.

According to this configuration, transmission loss in the transmission signal is further reduced while ensuring impedance mismatching at the fundamental frequency of the reception signal.

Additionally, it is preferable that a high-frequency front end circuit according to a preferred embodiment of the present invention have the following configuration. The phase adjustment circuit includes at least one mounted electronic component including a reactance component.

According to this configuration, it is easy to change the configuration of the phase adjustment circuit, and thus the impedance mismatching between the transmission filter and the power amplifier at the fundamental frequency of the reception signal is able to be realized with more certainty.

Additionally, a high-frequency front end circuit according to a preferred embodiment of the present invention may have the following configuration. The phase adjustment circuit carries out phase adjustment in accordance with the length of a transmission line that transmits the transmission signal.

According to this configuration, the high-frequency front end circuit is able to be realized with a simple configuration while ensuring impedance mismatching between the transmission filter and the power amplifier at the fundamental frequency of the reception signal with certainty.

Additionally, a high-frequency front end circuit according to a preferred embodiment of the present invention may have the following configuration. The high-frequency front end circuit includes a demultiplexing circuit, a power amplifier, and a phase adjustment circuit. The demultiplexing circuit includes a transmission filter configured so that a fundamental frequency band of a transmission signal is within a pass band of the transmission filter and a reception filter configured so that a fundamental frequency band of a reception signal is within a pass band of the reception filter. In the demultiplexing circuit, one end of the transmission filter and one end of the reception filter are electrically connected with a common connection point provided therebetween. The power amplifier is electrically connected to another end of the transmission filter. The phase adjustment circuit is included in the transmission filter.

The phase adjustment circuit carries out phase adjustment as follows. It is assumed that a Smith chart is divided into four quadrants by a first line indicating a pure resistance and a second line that connects points of phases of 90° on the outer circumference of the Smith chart to a reference impedance point. The phase adjustment circuit functions so that at the fundamental frequency of the reception signal, a quadrant where a phase of the power amplifier seen from the transmission filter is present and a quadrant where a phase seen from the power amplifier toward the transmission filter is present are not in a conjugate relationship.

According to this configuration, the transmission filter also functions as the phase adjustment circuit, and thus the circuit configuration of the high-frequency front end circuit is able to be simplified.

Additionally, it is preferable that a high-frequency front end circuit according to a preferred embodiment of the present invention have the following configuration. The transmission filter includes a plurality of resonators. The phase adjustment circuit is constituted of a resonator connected to the power amplifier.

According to this configuration, a signal at the fundamental frequency of the reception signal is reflected at an input end to the transmission filter from the power amplifier, and is therefore prevented from sneaking into the reception filter more effectively.

Additionally, a high-frequency front end circuit according to a preferred embodiment of the present invention includes a demultiplexing circuit, power amplifiers, and a phase adjustment circuit. The demultiplexing circuit includes a first transmission filter configured so that a fundamental frequency band of a first transmission signal is within a pass band of the first transmission filter, a second transmission filter configured so that a fundamental frequency band of a second transmission signal that is different from the first transmission signal is within a pass band of the second transmission filter, and a reception filter configured so that a fundamental frequency band of a first reception signal is within a pass band of the reception filter, with one end of the first transmission filter, one end of the second transmission filter, and one end of the reception filter being connected. The power amplifiers are each connected to another end of the first transmission filter and another end of the second transmission filter. The phase adjustment circuit is connected between the power amplifier and the second transmission filter or is included in the second transmission filter. A harmonic frequency of the second transmission signal and the fundamental frequency of the reception signal are close to each other.

The phase adjustment circuit carries out phase adjustment as follows. It is assumed that a Smith chart is divided into four quadrants by a first line indicating a pure resistance and a second line that connects points of phases of 90° on the outer circumference of the Smith chart to a reference impedance point. The phase adjustment circuit functions so that at the harmonic frequency of the second transmission signal, a quadrant where a phase of the power amplifier seen from the second transmission filter is present and a quadrant where a phase seen from the power amplifier toward the second transmission filter is present are not in a conjugate relationship.

According to this configuration, it is easy to ensure impedance mismatching between the power amplifier and the second transmission filter at the harmonic frequency of the second transmission signal. This prevents a harmonic signal of the second transmission signal having a frequency near the fundamental frequency of the reception signal from sneaking into the reception filter side.

According to preferred embodiments of the present invention, isolation is to be ensured with certainty between a transmission side and a reception side even for a reception signal band, which makes it possible to significantly reduced or prevented reception sensitivity decay.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
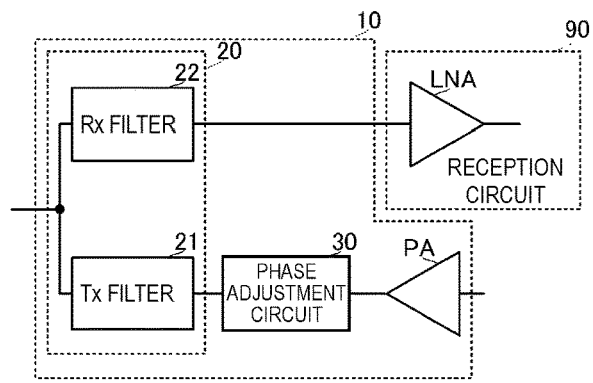
FIG. 1 is a block diagram illustrating a high-frequency front end circuit according to a first preferred embodiment of the present invention.

A high-frequency front end circuit according to a first preferred embodiment of the present invention will be described with reference to the drawings. FIG. 1 is a block diagram illustrating the high-frequency front end circuit according to the first preferred embodiment of the present invention.

As illustrated in FIG. 1, a high-frequency front end circuit 10 includes a duplexer 20, a phase adjustment circuit 30, and a power amplifier PA. The duplexer 20 includes a Tx filter 21 corresponding to a "transmission filter" and an Rx filter 22 corresponding to a "reception filter".

One end of the Tx filter 21 and one end of the Rx filter 22 are connected to a common connection point. This connection point is connected to an antenna or an antenna-side circuit (not shown). This antenna transmits transmission signals that have traversed the Tx filter 21 to the exterior, and receives reception signals from the exterior.

The fundamental frequency of a transmission signal of a predetermined communication standard is located within the pass band of the Tx filter 21. The Tx filter 21 is configured to provide a predetermined attenuation with respect to the frequency of a reception signal of the predetermined communication standard.

The fundamental frequency of the reception signal of the predetermined communication standard is located within the pass band of the Rx filter 22. Another end of the Rx filter 22 is connected to a low-noise amplifier LNA of a reception circuit 90. Here, a matching circuit for impedance matching at the frequency of the reception signal may be provided between the Rx filter 22 and the low-noise amplifier LNA.

Another end of the Tx filter 21 is connected to an output end of the power amplifier PA with the phase adjustment circuit 30 provided therebetween. Note that an input end of the power amplifier PA is connected to a transmission signal generating circuit (not shown).

Figure 2:
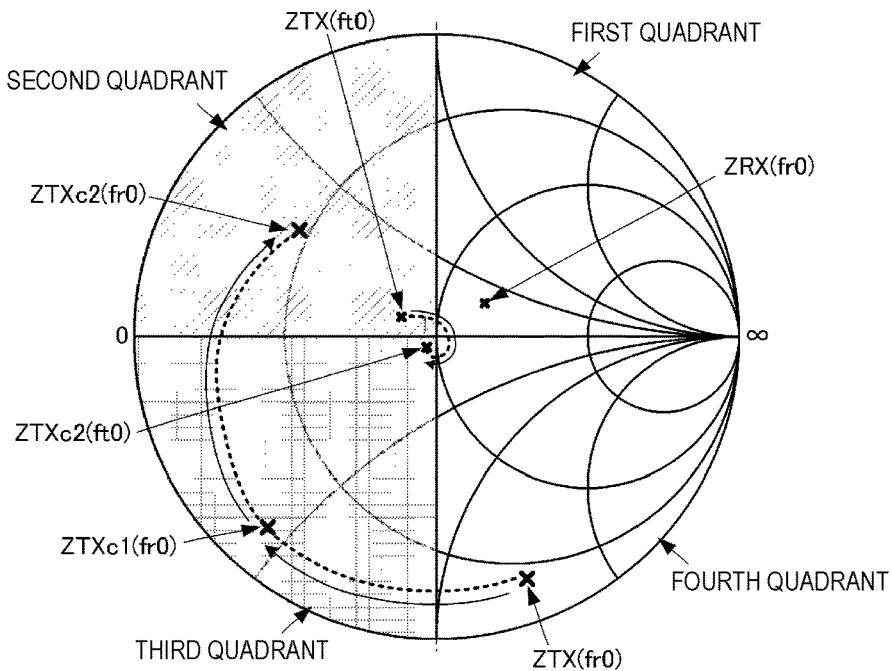
FIG. 2 is a Smith chart illustrating a principle of the high-frequency front end circuit according to the first preferred embodiment of the present invention.

The phase adjustment circuit 30 has a circuit configuration to perform impedance matching between the Tx filter 21 and the power amplifier PA in the fundamental frequency band of the transmission signal. Furthermore, the phase adjustment circuit 30 has a circuit configuration based on the principle described below. FIG. 2 is a Smith chart illustrating a principle of the high-frequency front end circuit according to the first preferred embodiment of the present invention.

As illustrated in FIG. 2, according to a preferred embodiment of the high-frequency front end circuit 10 of the present invention, the Smith chart is divided in the four quadrants described below, and the phase adjustment is carried out using whether or not an impedance is present in one of the stated four quadrants. Note that FIG. 2 illustrates a normalized Smith chart. In other words, an impedance of 50Ω is indicated as impedance 1 in FIG. 2.

First, the manner in which the Smith chart is divided into the quadrants will be described. A pure resistance line in the Smith chart, or in other words, a line spanning from the point of impedance 0 to the point of impedance ∞ through the point of impedance 1 (a reference impedance point) in FIG. 2, is taken as a first line. Next, a line that passes through two points at phases of 90° on the outer circumference of the Smith chart and the point of impedance 1 (the reference impedance point) is taken as a second line. The four regions into which the Smith chart is divided by the first line and the second line, which are perpendicular or substantially perpendicular to each other, are taken as first, second, third, and fourth quadrants. The first quadrant is a region including an inductive reactance and a high impedance, and the second quadrant is a region including an inductive reactance and a low impedance. The third quadrant is a region including a capacitive reactance and a low impedance, and the fourth quadrant is a region including a capacitive reactance and a high impedance.

In FIG. 2, ZRX (fr0) indicates an impedance seen from the Tx filter 21 toward the power amplifier PA at the fundamental frequency of the reception signal in a state where the phase adjustment circuit 30 is not used. ZTX (fr0) indicates an impedance seen from the power amplifier PA toward the Tx filter 21 at the fundamental frequency of the reception signal in a state where the phase adjustment circuit 30 is not used. ZTXc1 (fr0) indicates a first impedance seen from the power amplifier PA toward the Tx filter 21 at the fundamental frequency of the reception signal in a state where the phase adjustment circuit 30 is used. ZTXc2 (fr0) indicates a second impedance seen from the power amplifier PA toward the Tx filter 21 at the fundamental frequency of the reception signal in a state where the phase adjustment circuit 30 is used. ZTX (ft0) indicates an impedance seen from the power amplifier PA toward the Tx filter 21 at the fundamental frequency of the transmission signal in a state where the phase adjustment circuit 30 is not used. ZTXc2 (ft0) indicates an impedance seen from the power amplifier PA toward the Tx filter 21 at the fundamental frequency of the transmission signal in a state where the phase adjustment circuit 30 is used.

As indicated in FIG. 2, in the case of quadrants in which the phase of the impedance ZRX (fr0) seen from the Tx filter 21 toward the power amplifier PA at the fundamental frequency of the reception signal and the phase of the impedance ZTX (fr0) seen from the power amplifier PA toward the Tx filter 21 at the fundamental frequency of the reception signal are in a conjugate relationship, the phase adjustment circuit 30 shifts the phase. Accordingly, as indicated by the impedance ZTXc1 (fr0), the impedance ZTXc2 (fr0), and so on, for the quadrant in which the impedance ZRX (fr0) is present, the impedance is shifted to a quadrant not in a conjugate relationship therewith.

The power amplifier PA and the Tx filter 21 have mismatched impedances at the fundamental frequency of the reception signal as a result. Accordingly, noise at the same frequency as the fundamental frequency of the reception signal is not inputted into the Tx filter 21 from the power amplifier PA. As a result, this noise does not enter into the Rx filter 22 through the Tx filter 21, which makes it possible to significantly reduce or prevent decay in the reception sensitivity.

Furthermore, as indicated in FIG. 2, providing the phase adjustment circuit 30 makes it possible to bring the impedance at the fundamental frequency of the transmission signal closer to the reference impedance (e.g., about 50Ω). As a result, transmission loss of the transmission signal is able to be reduced further, which in turn makes it possible to improve the transmission characteristics.

Figure 3:
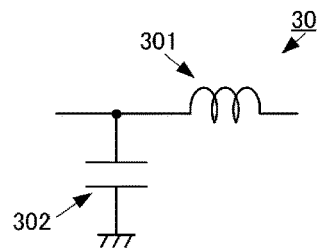
FIG. 3 is an equivalent circuit diagram illustrating an example of a phase adjustment circuit according to the first preferred embodiment of the present invention.

To achieve such a phase shift, the phase adjustment circuit 30 is provided with a circuit configuration such as that illustrated in FIG. 3, for example. FIG. 3 is an equivalent circuit diagram illustrating an example of the phase adjustment circuit according to the first preferred embodiment of the present invention.

The phase adjustment circuit 30 includes an inductor 301 and a capacitor 302. The inductor 301 is connected to the power amplifier PA and the Tx filter 21. The capacitor 302 is connected between the Tx filter 21 side of the inductor 301 and a ground. The inductance of the inductor 301 and the capacitance of the capacitor 302 are set such that the phase shift indicated in FIG. 2 is able to be achieved.

Note that the inductor 301, the capacitor 302, and so on may be realized as electrode patterns provided on a board or as mounted electronic components. In the case where the inductor 301, the capacitor 302, and so on are realized as electrode patterns, the phase adjustment circuit 30 is able to be realized through a simple configuration, and the high-frequency front end circuit 10 is therefore also able to be realized through a simple configuration. On the other hand, in the case where the inductor 301, the capacitor 302, and so on are realized as mounted electronic components, the inductance, capacitance, and so on is able to be changed simply by replacing the mounted electronic components, which makes it easy to adjust the inductance, capacitance, and so on. The desired phase shift amount is thus able to be achieved more precisely.

Figure 4:
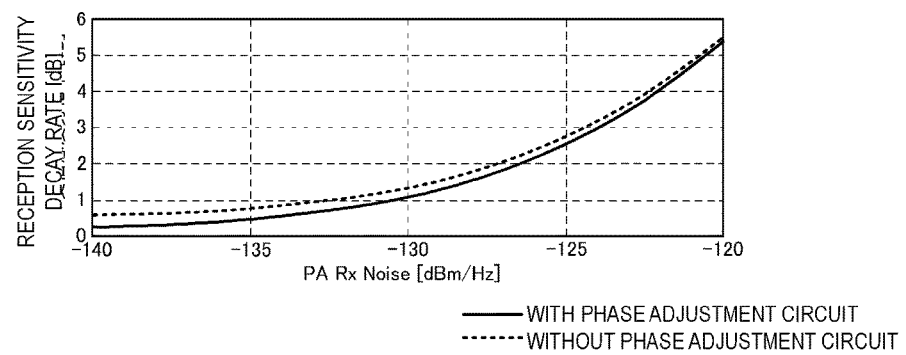
FIG. 4 is a graph illustrating reception sensitivity decay rate characteristics in a case where the high-frequency front end circuit according to the first preferred embodiment of the present invention is used and in a case where the high-frequency front end circuit according to the first preferred embodiment of the present invention is not used.

FIG. 4 is a graph illustrating reception sensitivity decay rate characteristics in the case where the high-frequency front end circuit according to the first preferred embodiment of the present invention is used and in the case where the high-frequency front end circuit according to the first preferred embodiment of the present invention is not used. The horizontal axis in FIG. 4 represents a level of noise produced by the power amplifier PA at the fundamental frequency of the reception signal. The vertical axis in FIG. 4 represents the reception sensitivity decay rate. The solid line represents a case where the phase adjustment circuit 30 according to the present preferred embodiment is provided, whereas the broken line represents a case where the phase adjustment circuit 30 according to the present preferred embodiment is not provided.

As indicated in FIG. 4, the reception sensitivity decay rate is able to be reduced by using the configuration according to the present preferred embodiment.

Figure 5:
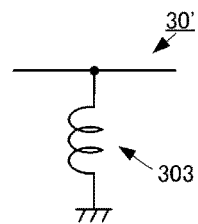
FIG. 5 is an equivalent circuit diagram illustrating another configuration of the phase adjustment circuit according to the first preferred embodiment of the present invention.

Note that the phase adjustment circuit may have the circuit configuration described below. FIG. 5 is an equivalent circuit diagram illustrating another configuration of the phase adjustment circuit according to the first preferred embodiment of the present invention. A phase adjustment circuit 30' includes an inductor 303. The inductor 303 is connected between a connection line that connects the power amplifier PA to the Tx filter 21, and a ground.

Figure 6:
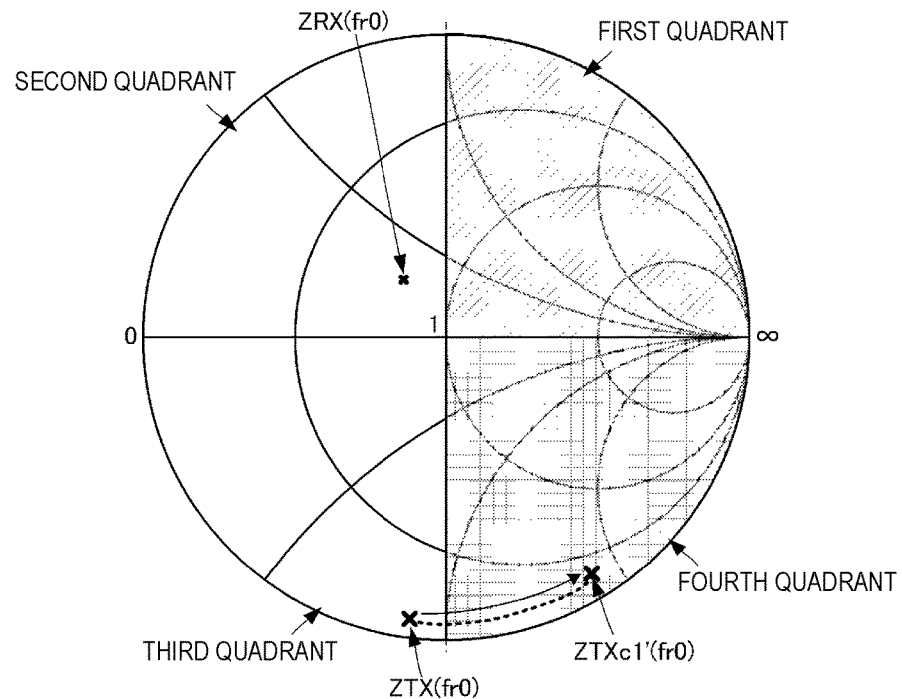
FIG. 6 is a Smith chart illustrating a principle of another configuration of the high-frequency front end circuit according to the first preferred embodiment of the present invention.

As illustrated in FIG. 6, with such a configuration, the direction of the phase shift is opposite from the case illustrated in FIG. 2. FIG. 6 is a Smith chart illustrating a principle of this other configuration of the high-frequency front end circuit according to the first preferred embodiment of the present invention. As indicated in FIG. 6, in the case of quadrants in which the phase of the impedance ZRX (fr0) seen from the Tx filter 21 toward the power amplifier PA at the fundamental frequency of the reception signal and the phase of the impedance ZTX (fr0) seen from the power amplifier PA toward the Tx filter 21 at the fundamental frequency of the reception signal are in a conjugate relationship, the phase is shifted in this case as well. Accordingly, as indicated by an impedance ZTXc1' (fr0), for the quadrant in which the impedance ZRX (fr0) is present, the impedance is able to be shifted to a quadrant not in a conjugate relationship therewith.

The reception sensitivity decay rate is able to be reduced in the same manner by carrying out such a phase shift as well.

Note that it is preferable that the phase of the impedance seen from the Tx filter 21 toward the power amplifier PA and the phase of the impedance seen from the power amplifier PA toward the Tx filter 21 at the fundamental frequency of the reception signal be in quadrants on the same side relative to the pure resistance line (the first line) and quadrants that oppose each other relative to the second line. Such a relationship makes it possible to increase the impedance mismatching between the Tx filter 21 and the power amplifier PA at the fundamental frequency of the reception signal. Accordingly, noise is able to be suppressed from leaking to the Rx filter 22 with more certainty, and the reception sensitivity decay rate is able to be reduced even further.

Figure 7:
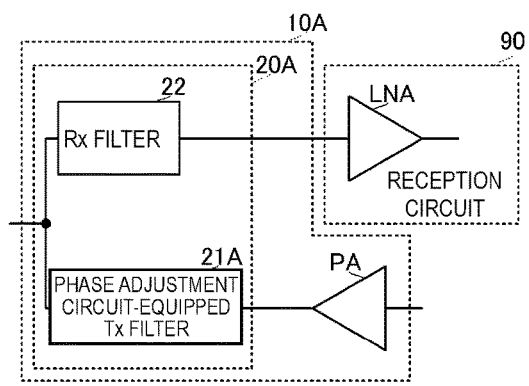
FIG. 7 is a block diagram illustrating a front end circuit according to a second preferred embodiment of the present invention.

Next, a high-frequency front end circuit according to a second preferred embodiment of the present invention will be described with reference to the drawings. FIG. 7 is a block diagram illustrating the high-frequency front end circuit according to the second preferred embodiment of the present invention. In a high-frequency front end circuit 10A according to the present preferred embodiment, the function of the phase adjustment circuit 30 described in the first preferred embodiment is incorporated into the Tx filter, which are realized as a phase adjustment circuit-equipped Tx filter 21A. The other configurations are the same as those of the high-frequency front end circuit 10 according to the first preferred embodiment. As such, only differences from the high-frequency front end circuit 10 according to the first preferred embodiment will be described in detail.

The high-frequency front end circuit 10A includes a duplexer 20A and the power amplifier PA. The duplexer 20A includes the phase adjustment circuit-equipped Tx filter 21A and the Rx filter 22. One end of the phase adjustment circuit-equipped Tx filter 21A and one end of the Rx filter 22 are connected. Another end of the phase adjustment circuit-equipped Tx filter 21A is connected to the power amplifier PA.

The phase adjustment circuit-equipped Tx filter 21A is configured so that its pass band contains the fundamental frequency of the transmission signal and so that impedance mismatching with the power amplifier PA is achieved at the fundamental frequency of the reception signal as described above. To rephrase, the phase adjustment circuit-equipped Tx filter 21A is configured so that the phase of the impedance seen toward the power amplifier PA at the fundamental frequency of the reception signal is at least not opposite from the phase of the impedance seen from the power amplifier PA toward the phase adjustment circuit-equipped Tx filter 21A. Furthermore, the phase adjustment circuit-equipped Tx filter 21A may be set so that the phase of the impedance seen toward the power amplifier PA at the fundamental frequency of the reception signal is the same as the phase of the impedance seen from the power amplifier PA toward the phase adjustment circuit-equipped Tx filter 21A.

Figure 8:
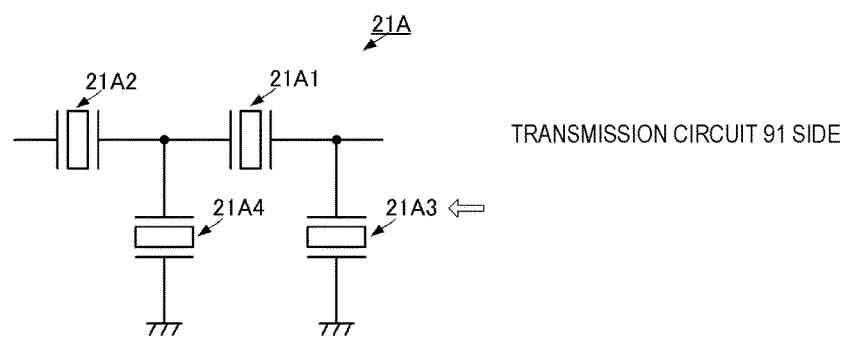
FIG. 8 is an equivalent circuit diagram illustrating a phase adjustment circuit-equipped Tx filter according to the second preferred embodiment of the present invention.

Specifically, the phase adjustment circuit-equipped Tx filter 21A has the following circuit configuration. FIG. 8 is an equivalent circuit diagram illustrating the phase adjustment circuit-equipped Tx filter according to the second preferred embodiment of the present invention. The phase adjustment circuit-equipped Tx filter 21A includes a plurality of resonators 21A1, 21A2, 21A3, and 21A4. The resonators 21A1 and 21A2 are connected in series, with the resonator 21A1 connected to the power amplifier PA and the resonator 21A2 connected to a point of connection with the Rx filter 22. The resonator 21A3 is connected between the power amplifier PA side of the resonator 21A1 and a ground. The resonator 21A4 is connected between a connection line that connects the resonators 21A1 and 21A2, and a ground.

Here, the above-described impedance mismatching with respect to the fundamental frequency of the reception signal is realized by adjusting the characteristics of the resonator 21A3, which is closest to the power amplifier PA. With such a configuration, impedance mismatching between the power amplifier PA and the phase adjustment circuit-equipped Tx filter 21A at the fundamental frequency of the reception signal is realized more effectively.

Providing such a configuration makes it possible to reduce the reception sensitivity decay rate in the same manner as in the first preferred embodiment. Furthermore, the phase adjustment circuit and the Tx filter are integrated in the configuration of the present preferred embodiment, which makes it possible to simplify the circuit configuration of the high-frequency front end circuit.

Figure 9:
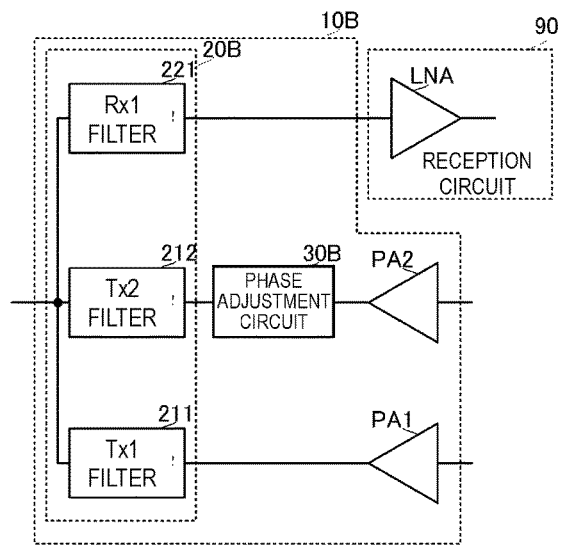
FIG. 9 is a block diagram illustrating a high-frequency front end circuit according to a third preferred embodiment of the present invention.

Next, a high-frequency front end circuit according to a third preferred embodiment of the present invention will be described with reference to the drawings. FIG. 9 is a block diagram illustrating the high-frequency front end circuit according to the third preferred embodiment of the present invention. Note that the present preferred embodiment describes a case where a third-order harmonic frequency of a second transmission signal is close to the fundamental frequency of a first reception signal, and in which carrier aggregation, where the second transmission signal is transmitted and the first reception signal is received simultaneously, is carried out.

As illustrated in FIG. 9, the high-frequency front end circuit according to the present preferred embodiment has a triplexer configuration instead of the duplexer configuration described in the first and second preferred embodiments of the present invention.

As illustrated in FIG. 9, a high-frequency front end circuit 10B includes a triplexer 20B, a phase adjustment circuit 30B, and power amplifiers PA1 and PA2. The triplexer 20B includes a Tx1 filter 211 corresponding to a "first transmission filter", a Tx2 filter 212 corresponding to a "second transmission filter", and an Rx1 filter 221 corresponding to a "first reception filter".

One end of the Tx1 filter 211, one end of the Tx2 filter 212, and one end of the Rx1 filter 221 are connected. This connection point is connected to an antenna or an antenna-side circuit (not shown). This antenna is an antenna that transmits transmission signals that have traversed the Tx1 filter 211 or the Tx2 filter 212 to the exterior, and receives reception signals from the exterior.

The Tx1 filter 211 is configured so that its pass band contains the fundamental frequency of a first transmission signal. The Tx1 filter 211 is configured to provide a predetermined attenuation with respect to the frequencies of the first reception signal and the second transmission signal.

The Tx2 filter 212 is configured so that its pass band contains the fundamental frequency of the second transmission signal. The Tx2 filter 211 is configured to provide a predetermined attenuation with respect to the frequencies of the first transmission signal and the first reception signal.

The Rx1 filter 221 is configured so that its pass band contains the fundamental frequency of the first reception signal. Another end of the Rx1 filter 221 is connected to the LNA of the reception circuit 90. Here, a matching circuit to perform impedance matching at the frequency of the reception signal may be provided between the Rx1 filter 221 and the LNA.

Another end of the Tx1 filter 211 is connected to an output end of the power amplifier PA1. Note that an input end of the power amplifier PA1 is connected to a transmission signal generating circuit (not shown).

Another end of the Tx2 filter 212 is connected to an output end of the power amplifier PA2 with the phase adjustment circuit 30B provided therebetween. Note that an input end of the power amplifier PA2 is connected to a transmission signal generating circuit (not shown). The power amplifiers PA1 and PA2 may be integrated.

Figure 10:
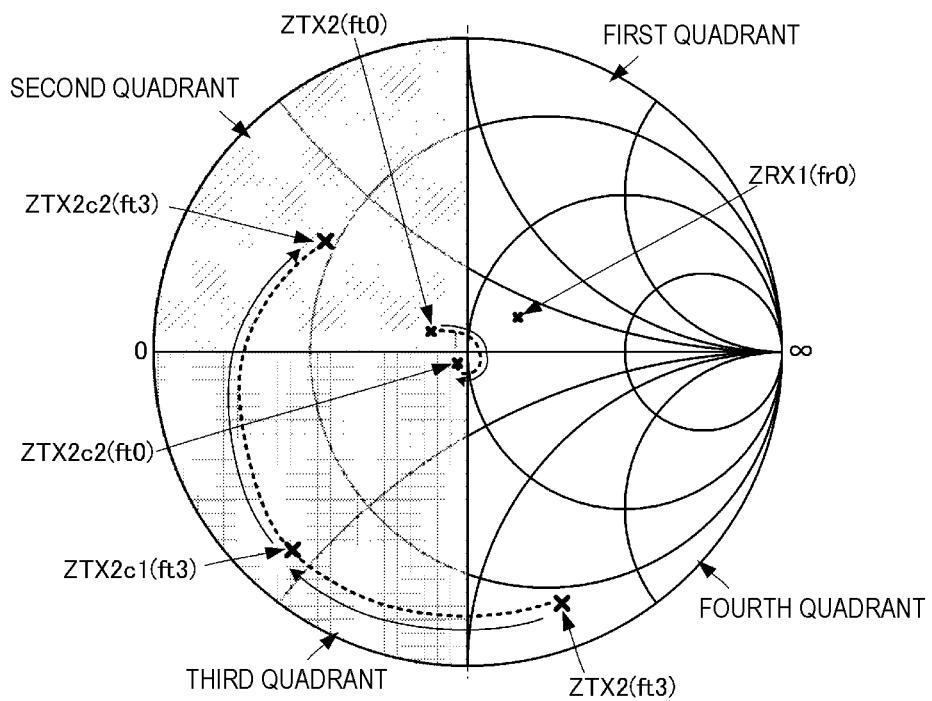
FIG. 10 is a Smith chart illustrating a principle of the high-frequency front end circuit according to the third preferred embodiment of the present invention.

The phase adjustment circuit 30B has a circuit configuration to perform impedance matching between the Tx2 filter 212 and the power amplifier PA2 in the fundamental frequency band of the second transmission signal. Furthermore, the phase adjustment circuit 30B has a circuit configuration based on the principles described below. FIG. 10 is a Smith chart illustrating a principle of the high-frequency front end circuit according to the third preferred embodiment of the present invention. The Smith chart illustrated in FIG. 10 is the same as the Smith chart illustrated in FIG. 2, and is divided into four quadrants according to the same concept as that illustrated in FIG. 2.

In FIG. 10, ZRX1 (fr0) indicates an impedance seen from the Tx2 filter 212 toward the power amplifier PA2 at the fundamental frequency of the first reception signal in a state where the phase adjustment circuit 30B is not used. ZTX2 (ft3) indicates an impedance seen from the power amplifier PA2 toward the Tx filter 212 at the third-order harmonic frequency of the second transmission signal in a state where the phase adjustment circuit 30B is not used. ZTX2$c$1 (ft3) indicates a first impedance seen from the power amplifier PA2 toward the Tx filter 212 at the third-order harmonic frequency of the second transmission signal in a state where the phase adjustment circuit 30B is used. ZTX2$c$2 (ft3) indicates a second impedance seen from the power amplifier PA2 toward the Tx filter 212 at the third-order harmonic frequency of the second transmission signal in a state where the phase adjustment circuit 30B is used. ZTX2 (ft0) indicates an impedance seen from the power amplifier PA2 toward the Tx filter 212 at the fundamental frequency of the second transmission signal in a state where the phase adjustment circuit 30B is not used. ZTX2$c$2 (ft0) indicates an impedance seen from the power amplifier PA2 toward the Tx filter 212 at the fundamental frequency of the second transmission signal in a state where the phase adjustment circuit 30B is used.

As indicated in FIG. 10, in the case of quadrants in which the phase of the impedance ZRX1 (fr0) seen from the Tx filter 212 toward the power amplifier PA2 at the fundamental frequency of the first reception signal and the phase of the impedance ZTX2 (ft3) seen from the power amplifier PA2 toward the Tx filter 212 at the third-order harmonic frequency of the second transmission signal are in a conjugate relationship, the phase adjustment circuit 30B serves to shift the phase of the impedance ZTX2 (ft3). Accordingly, as indicated by the impedance ZTX2$c$1 (ft3), the impedance ZTX2$c$2 (ft3), and so on, for the quadrant in which the impedance ZRX1 (fr0) is present, the impedance is shifted to a quadrant not in a conjugate relationship therewith.

The power amplifier PA2 and the Tx filter 212 have mismatched impedances at the fundamental frequency of the first reception signal, the third-order harmonic frequency of the second transmission signal, and so on as a result. Accordingly, a third-order harmonic signal of the second transmission signal is not inputted into the Tx filter 212 from the power amplifier PA2. As a result, the third-order harmonic signal of the second transmission signal does not enter into the Rx1 filter 221 through the Tx filter 212, which makes it possible to significantly reduced or prevent decay in the reception sensitivity with respect to the first reception signal even when carrying out carrier aggregation.

Furthermore, as indicated in FIG. 10, providing the phase adjustment circuit 30B makes it possible to bring the impedance at the fundamental frequency of the second transmission signal closer to the reference impedance (e.g., about 50Ω). Through this, transmission loss of the second transmission signal is reduced further, which in turn makes it possible to improve the transmission characteristics.

Although the foregoing describes a case where the fundamental frequency of the first reception signal and the third-order harmonic frequency of the second transmission signal are brought closer together, the above-described configuration can also be applied in a case where another harmonic frequency of the second transmission signal and the fundamental frequency of the first reception signal are brought closer together.

Accordingly, using the configurations of the various present preferred embodiments makes it possible to reduce the reception sensitivity decay rate of the reception signal even when the harmonic frequency of the transmission signal for which carrier aggregation is carried out is brought closer to the fundamental frequency of the reception signal.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency front end circuit comprising:
a demultiplexing circuit, including a transmission filter configured so that a fundamental frequency band of a transmission signal is within a pass band of the transmission filter and a reception filter configured so that a fundamental frequency band of a reception signal is within a pass band of the reception filter, in which a first end of the transmission filter and a first end of the reception filter are electrically connected with a common connection point provided therebetween;
a power amplifier electrically connected to a second end of the transmission filter; and
a phase adjustment circuit electrically connected between the power amplifier and the transmission filter; wherein
a Smith chart is divided into four quadrants by a first line indicating a pure resistance and a second line that connects points of phases of 90° on an outer circumference of the Smith chart to a reference impedance point;
the phase adjustment circuit carries out phase adjustment so that at a fundamental frequency of the reception signal, a quadrant where a phase of the power amplifier seen from the transmission filter is present and a quadrant where a phase seen from the power amplifier toward the transmission filter is present are not in a conjugate relationship.

2. The high-frequency front end circuit according to claim 1, wherein the phase adjustment circuit carries out the phase adjustment so that at the fundamental frequency of the reception signal, a quadrant where a phase of the power amplifier seen from the transmission filter is present and a quadrant where a phase seen from the power amplifier toward the transmission filter is present are located on opposite sides of the second line.

3. The high-frequency front end circuit according to claim 1, wherein the phase adjustment circuit carries out the phase adjustment so that an impedance at a fundamental frequency of the transmission signal becomes closer to the reference impedance point.

4. The high-frequency front end circuit according to claim 1, wherein the phase adjustment circuit includes at least one mounted electronic component including a reactance component.

5. The high-frequency front end circuit according to claim 1, wherein the phase adjustment circuit carries out phase adjustment in accordance with a length of a transmission line that transmits the transmission signal.

6. The high-frequency front end circuit according to claim 1, wherein the power amplifier and the transmission filter have mismatched impedances at the fundamental frequency of the reception signal.

7. The radio frequency front-end circuit according to claim 1, wherein the phase adjustment circuit includes an inductor connected between the power amplifier and the transmission filter, and a capacitor connected between the transmission filter and a ground.

8. The radio frequency front-end circuit according to claim 7, wherein each of the inductor and the capacitor is defined by one of an electrode pattern on a board and a mounted electronic component.

9. A high-frequency front end circuit comprising:
a demultiplexing circuit, including a transmission filter configured so that a fundamental frequency band of a transmission signal is within a pass band of the transmission filter and a reception filter configured so that a fundamental frequency band of a reception signal is within a pass band of the reception filter, in which a first end of the transmission filter and a first end of the reception filter are electrically connected with a common connection point provided therebetween;
a power amplifier electrically connected to a second end of the transmission filter; and
a phase adjustment circuit included in the transmission filter; wherein
a Smith chart is divided into four quadrants by a first line indicating a pure resistance and a second line that connects points of phases of 90° on an outer circumference of the Smith chart to a reference impedance point;
the phase adjustment circuit carries out phase adjustment so that at a fundamental frequency of the reception signal, a quadrant where a phase of the power amplifier seen from the transmission filter is present and a quadrant where a phase seen from the power amplifier toward the transmission filter is present are not in a conjugate relationship.

10. The high-frequency front end circuit according to claim 9, wherein
the transmission filter includes a plurality of resonators; and
the phase adjustment circuit includes a resonator connected to the power amplifier.

11. The high-frequency front end circuit according to claim 10, wherein the plurality of resonators of the transmission filter are connected in series.

12. The high-frequency front end circuit according to claim 10, wherein a first of the plurality of resonators of the transmission filter is connected to the power amplifier, a second of the plurality of resonators of the transmission filter is connected in to a point of connection with the reception filter, a third of the plurality of resonators of the transmission filter is connected between the power amplifier and a ground, a fourth of the plurality of resonators is connected between a connection line that connects the first and second of the plurality of resonators and the ground.

13. A high-frequency front end circuit comprising:
a demultiplexing circuit, including a first transmission filter configured so that a fundamental frequency band of a first transmission signal is within a pass band of the first transmission filter, a second transmission filter configured so that a fundamental frequency band of a second transmission signal that is different from the first transmission signal is within a pass band of the second transmission filter, and a reception filter configured so that a fundamental frequency band of a first reception signal is within a pass band of the reception filter, in which a first end of the first transmission filter, a first end of the second transmission filter, and a first end of the reception filter are electrically connected with a common connection point provided therebetween;

power amplifiers each electrically connected to a second end of the first transmission filter and a second end of the second transmission filter; and a phase adjustment circuit connected between the power amplifier and the second transmission filter or included in the second transmission filter; wherein a harmonic frequency of the second transmission signal and the fundamental frequency of the reception signal are close to each other; and a Smith chart is divided into four quadrants by a first line indicating a pure resistance and a second line that connects points of phases of 90° on an outer circumference of the Smith chart to a reference impedance point;

the phase adjustment circuit carries out phase adjustment so that at the harmonic frequency of the second transmission signal, a quadrant where a phase of the power amplifier seen from the second transmission filter is present and a quadrant where a phase seen from the power amplifier toward the second transmission filter is present are not in a conjugate relationship.

14. The high-frequency front end circuit according to claim 12, wherein the demultiplexing circuit has a triplexer configuration.

15. The high-frequency front end circuit according to claim 12, wherein one of the power amplifiers and one of the first and second transmission filters have mismatched impedances at the fundamental frequency of the first reception signal.

16. The high-frequency front end circuit according to claim 12, wherein one of the power amplifiers and one of the first and second transmission filters have mismatched impedances at a third harmonic frequency of the second transmission signal.

* * * * *